(12) United States Patent
Manhardt et al.

(10) Patent No.: US 10,275,287 B2
(45) Date of Patent: Apr. 30, 2019

(54) CONCURRENT DISTRIBUTED GRAPH PROCESSING SYSTEM WITH SELF-BALANCE

(71) Applicant: Oracle International Corporation, Redwood Shores, CA (US)

(72) Inventors: Thomas Manhardt, San Carlos, CA (US); Sungpack Hong, Palo Alto, CA (US); Siegfried Depner, Sunnyvale, CA (US); Jinsu Lee, San Mateo, CA (US); Nicholas Roth, San Jose, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/175,920

(22) Filed: Jun. 7, 2016

(65) Prior Publication Data

US 2017/0351551 A1 Dec. 7, 2017

(51) Int. Cl.
*G06F 9/50* (2006.01)
*H04L 29/08* (2006.01)
*G06F 9/52* (2006.01)

(52) U.S. Cl.
CPC .......... *G06F 9/5061* (2013.01); *G06F 9/5038* (2013.01); *G06F 9/5083* (2013.01); *H04L 67/10* (2013.01); *G06F 9/5066* (2013.01); *G06F 9/522* (2013.01)

(58) Field of Classification Search
None
See application file for complete search history.

(56) References Cited

U.S. PATENT DOCUMENTS

| 6,041,306 A | 3/2000 | Du |
| 7,167,850 B2 | 1/2007 | Stanfill |
| 7,322,033 B2 | 1/2008 | Ito |

(Continued)

OTHER PUBLICATIONS

U.S. Appl. No. 14/619,414, filed Feb. 11, 2015, Office Action, dated May 3, 2016.

(Continued)

*Primary Examiner* — Abu Ghaffari
(74) *Attorney, Agent, or Firm* — Hickman Palermo Becker Bingham LLP (57) ABSTRACT

Techniques are provided for dynamically self-balancing communication and computation. In an embodiment, each partition of application data is stored on a respective computer of a cluster. The application is divided into distributed jobs, each of which corresponds to a partition. Each distributed job is hosted on the computer that hosts the corresponding data partition. Each computer divides its distributed job into computation tasks. Each computer has a pool of threads that execute the computation tasks. During execution, one computer receives a data access request from another computer. The data access request is executed by a thread of the pool. Threads of the pool are bimodal and may be repurposed between communication and computation, depending on workload. Each computer individually detects completion of its computation tasks. Each computer informs a central computer that its distributed job has finished. The central computer detects when all distributed jobs of the application have terminated.

20 Claims, 6 Drawing Sheets

(56) References Cited

U.S. PATENT DOCUMENTS

| | | | | |
|---|---|---|---|---|
| 7,757,214 | B1* | 7/2010 | Palczak | G06F 9/5083 |
| | | | | 709/223 |
| 8,266,289 | B2* | 9/2012 | Saha | G06F 9/5027 |
| | | | | 700/99 |
| 8,312,464 | B2* | 11/2012 | Arimilli | G06F 9/522 |
| | | | | 718/102 |
| 8,607,249 | B2* | 12/2013 | Otenko | G06F 9/52 |
| | | | | 719/314 |
| 9,183,058 | B2* | 11/2015 | Li | G06F 9/5066 |
| 9,189,457 | B2* | 11/2015 | Le Goff | G06F 9/5083 |
| 9,361,154 | B2 | 6/2016 | Booman | |
| 9,385,845 | B1 | 7/2016 | Austern | |
| 9,477,532 | B1 | 10/2016 | Hong | |
| 9,639,407 | B1* | 5/2017 | Braverman | G06F 9/4843 |
| 9,652,286 | B2 | 5/2017 | Fan | |
| 9,838,242 | B2 | 12/2017 | Tully | |
| 9,852,230 | B2 | 12/2017 | Fleury | |
| 9,928,124 | B2* | 3/2018 | Vagg | G06F 9/546 |
| 2003/0084045 | A1 | 5/2003 | Anderson | |
| 2007/0294665 | A1* | 12/2007 | Papakipos | G06F 8/45 |
| | | | | 717/119 |
| 2009/0112784 | A1* | 4/2009 | Brun | G06F 9/5066 |
| | | | | 706/46 |
| 2009/0248754 | A1* | 10/2009 | Lipton | G06F 9/485 |
| 2012/0166645 | A1* | 6/2012 | Boldyrev | G06F 9/5083 |
| | | | | 709/226 |
| 2012/0304192 | A1 | 11/2012 | Grove | |
| 2012/0317579 | A1* | 12/2012 | Liu | G06F 9/5072 |
| | | | | 718/104 |
| 2012/0324472 | A1* | 12/2012 | Rossbach | G06F 9/467 |
| | | | | 718/106 |
| 2013/0031550 | A1* | 1/2013 | Choudhury | G06F 9/45558 |
| | | | | 718/1 |
| 2013/0042254 | A1* | 2/2013 | Archer | G06F 9/54 |
| | | | | 718/106 |
| 2013/0086328 | A1* | 4/2013 | Frank | G06F 12/0875 |
| | | | | 711/125 |
| 2014/0047140 | A1 | 2/2014 | Otenko | |
| 2014/0096138 | A1* | 4/2014 | Dean | G06F 17/30445 |
| | | | | 718/102 |
| 2014/0108489 | A1 | 4/2014 | Glines | |
| 2014/0115596 | A1* | 4/2014 | Khan | G06F 9/5011 |
| | | | | 718/104 |
| 2014/0130056 | A1 | 5/2014 | Goodman | |
| 2014/0181831 | A1* | 6/2014 | Le Scouarnec | G06F 9/5066 |
| | | | | 718/104 |
| 2014/0215477 | A1* | 7/2014 | Chen | G06F 9/5066 |
| | | | | 718/102 |
| 2014/0317292 | A1* | 10/2014 | Odom | G06F 9/5072 |
| | | | | 709/226 |
| 2014/0317635 | A1* | 10/2014 | Konno | G06F 9/505 |
| | | | | 718/105 |
| 2014/0337850 | A1* | 11/2014 | Iniguez | G06F 9/4843 |
| | | | | 718/102 |
| 2015/0007182 | A1 | 1/2015 | Rossbach | |
| 2015/0135185 | A1* | 5/2015 | Sirota | G06F 9/5061 |
| | | | | 718/103 |
| 2015/0187042 | A1* | 7/2015 | Gupta | G06F 9/3851 |
| | | | | 345/501 |
| 2016/0140152 | A1 | 5/2016 | Sevenich | |
| 2016/0217007 | A1* | 7/2016 | Ueno | G06F 9/505 |
| 2016/0232037 | A1 | 8/2016 | Depner et al. | |
| 2016/0292303 | A1 | 10/2016 | Hong | |
| 2016/0342445 | A1 | 11/2016 | Lugt et al. | |
| 2017/0124452 | A1 | 5/2017 | Tucker | |
| 2017/0168751 | A1 | 6/2017 | Stevens | |
| 2017/0199758 | A1* | 7/2017 | Gschwind | G06F 9/467 |
| 2018/0039709 | A1 | 2/2018 | Chen | |
| 2018/0210761 | A1 | 7/2018 | Lee et al. | |

OTHER PUBLICATIONS

U.S. Appl. No. 14/619,414, filed Feb. 11, 2015, Notice of Allowance, dated Aug. 23, 2016.

Lugt, U.S. Appl. No. 14/718,430, filed May 21, 2015, Office Action, dated Jan. 11, 2017.

Lugt, U.S. Appl. No. 14/718,430, filed May 21, 2015, Notice of Allowance, dated Apr. 20, 2017.

Xin et al., "GraphX Resilient Distributed Graph System on Spark", dated Jun. 23, 2013, Proceedings of the First International Workshop on Graph Data Management, 6 Pages.

Open MP Application Program, openmp.org/mpdocuments/OpenMP_4.0_RC2.pdf dated 2013, 418 pages.

Nelson et al., "Latency-Tolerant Software Distributed Shared Memory", Technical Report UW-CSE-14-05-03, dated 2014, 13 pages.

Malewicz et al., "Pregel: A System for Large-Scale Graph Processing", SIGMOD, ACM, dated Jun. 2010, 11 pages.

Low et al., "GraphLab: A New Framework for Parallel Machine Learning", dated Jun. 25, 2010, 10 pages.

Karypis, et al., "Multilevel Algorithms for Multi-Constraint Graph Partitioning", Technical Report #98-019, dated May 5, 1998, 25 pages.

docs.oracle.com/javase/7/docs/api/java/util/concurrent/ForkJoinPool. html, "Class ForkJoinPool", last viewed May 20, 2015, 11 pages.

Grappa, "Scaling Data-intensive Applications on Commodity Clusters", //grappa.io/, last viewed on May 6, 2015, 4 pages.

Giraph "Introduction to Apache Giraph", giraph.apache.org/intro. html, last viewed on May 6, 2015, 2 pages.

Dato.com, "GraphLab Create User Guide", Introduction, 1 page, last viewed on May 6, 2015, 1 page.

Lugt, U.S. Appl. No. 15/682,338, filed Aug. 21, 2017, Notice of Allowance, dated Mar. 1, 2018.

Lee, U.S. Appl. No. 15/413,811, filed Jan. 24, 2017, Office Action, dated Aug. 8, 2018.

Xin, et al., "GraphX: Unifying Data-Parallel and Graph-Parallel Analytics", dated Feb. 11, 2014, ACM, 12 pages.

Low et al., "Distributed GraphLab: A Framework for Machine Learning and Data Mining in the Cloud", Proceedings of the VLDB Endowment, vol. 5, No. 8, 12 pages, dated Aug. 27, 2012.

* cited by examiner

CONCURRENT DISTRIBUTED GRAPH PROCESSING SYSTEM WITH SELF-BALANCE

FIELD OF THE DISCLOSURE

This disclosure relates to workload balancing for distributed processing. Techniques are presented for avoiding bottlenecks by dynamically self-balancing communication and computation at any participating computer.

BACKGROUND

Graph analysis is a form of data analytics where the underlying dataset is represented as a graph. Graph databases are rapidly emerging to support graph analysis.

In order to process huge data sets that do not fit within the memory of a single computer, academia and industry use distributed graph processing systems. In these systems, graph data is partitioned over multiple computers of a cluster, and the computation is performed in a distributed manner. Several distributed systems for large graph analysis have been developed that emphasize scalability.

However, the performance of these systems remains suboptimal due to an inability to optimize computation and communication patterns that are typical of graph applications.

Because distributed graph analysis typically entails copious communication, a key challenge in architecting such a system is determining how to schedule remote data access efficiently. For example, existing solutions may rigidly and sub-optimally segregate computational threads from communication threads.

A distributed system may succumb to backpressure, priority inversion, starvation, and other inefficiencies to which distributed processing is prone. For example, synchronization checkpoints and other coordination overhead may cause idling.

Furthermore, each graph analysis performs different and varying amounts of computation and communication. This may thwart a-priori attempts to statically balance computation and communication on any particular computer of the system.

Likewise, optimal balance may be elusive when more than one analysis simultaneously occurs. Traditional approaches to multiple graph analyses have not implemented multitenant architecture.

Instead, such approaches duplicate infrastructure for each additional analysis. However, duplicate instantiations have direct costs, such as increased memory usage and redundant processing, and indirect costs such as missed opportunities for multitenant tuning.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Example System
        2.1 Data Partition
        2.2 Distributed Processing
        2.3 Thread Pool
        2.4 Communication
        2.5 Bimodal Thread
        2.6 Synchronization
    3.0 Example Process
        3.1 Preparation
        3.2 Operation
        3.3 Coordination
    4.0 Balancing Mechanisms and Heuristics
        4.1 Work Queue
        4.2 Multitasking
        4.3 Inbox
        4.4 Bias
        4.5 Batch
        4.6 Local Barrier
        4.7 Global Barrier
    5.0 Multitenancy
        5.1 Multitenant Thread Pool
        5.2 Job Thread Pool
        5.3 Priority
        5.4 Rebalancing
        5.5 Aging
        5.6 Bias
        5.7 Prioritization
    6.0 Communication
        6.1 Outbound: Buffering and Blocking
        6.2 Inbound
    7.0 Hardware Overview 1.0 General Overview Techniques are provided for dynamically self-balancing communication and computation. In an embodiment, data of an application is divided into partitions. Each partition is stored on a respective computer of a cluster. Likewise, the application is divided into distributed jobs, each of which corresponds to a respective partition. Each distributed job is hosted on whichever computer hosts the data partition that corresponds to the distributed job. Each computer processes its partition as follows.

Each computer divides its distributed job into computation tasks. Each computer has a pool of threads that execute the computation tasks. During execution, a first computer receives a data access request from a second computer. The data access request is executed by a thread of the pool. Threads of the pool are bimodal and may be dynamically repurposed between communication and computation, depending on actual workload. Each computer eventually and individually detects completion of its computation tasks. Each computer indicates to a central computer that its distributed job has finished. The central computer detects when all distributed jobs of the application have terminated.

In embodiments, each computer maintains a local barrier that monitors completion of the computation tasks. In embodiments, a backlog of computation tasks is queued.

In embodiments, computation tasks are de-queued and run in batches. In embodiments, communications are buffered at a high level.

In embodiments, mechanisms such as queues, buffers, and pools are managed according to heuristics that dynamically rebalance (adjust the prioritization of) computation and communication by each computer.

2.0 Example System

Figure 1:
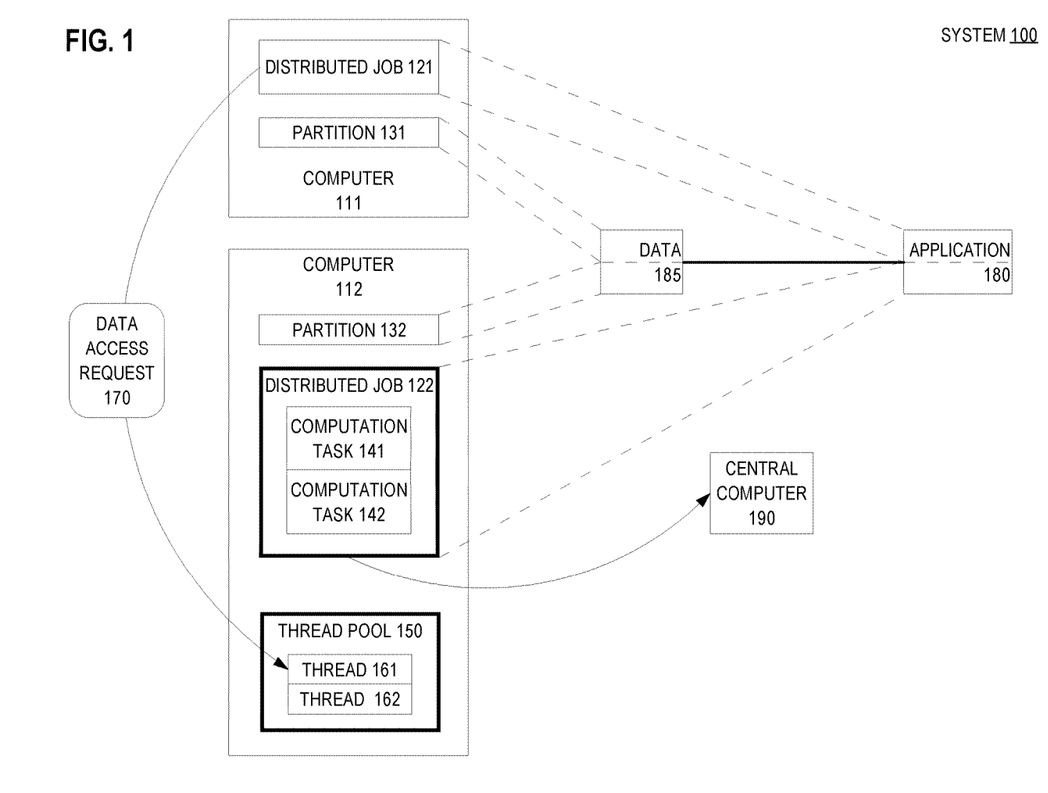
FIG. 1 is a block diagram that depicts an example distributed system of computers that dynamically self-balance communication and computation, in an embodiment.

FIG. 1 is a block diagram that depicts an example system 100 of computers that dynamically self-balance communication and computation, in an embodiment. Example system 100 uses a thread pool to process units of work of a distributed analysis.

System 100 contains central computer 190 and a plurality of peer computers such as 111-112. Each of these computers may be a rack server such as a blade, a personal computer, a mainframe, a smartphone, a networked appliance, or other networked computing device. Computers 111-112 and 190 communicate with each other over a computer network, such as a local area network (LAN) or internetwork of networks.

2.1 Data Partition

System 100 hosts distributed application 180 that analyzes potentially huge data 185. Data 185 may include a graph, a table, or other dataset that is readily subdivided.

Data 185 is divided into coarse chunks of more or less equal size, such as partitions 131-132. Each partition is distributed to a respective peer computer, such as 111-112.

Each peer computer has at least one partition. For example, computer 111 has partition 131.

If data 185 is split into more partitions than available peer computers, then each peer computer stores a more or less equal amount of multiple partitions. For example if data 185 is split into five partitions, then computer 111 may store three partitions, and computer 112 may store two partitions. However, one partition per computer is optimal.

Computer 111 is shown as containing partition 131. Partition 131 may occupy any combination of devices inside or attached to computer 111. For example, partition 131 may reside within volatile and/or non-volatile storage devices such as dynamic random access memory (DRAM), flash, mechanical disk, or network attached storage.

2.2 Distributed Processing

Application 180 may be a computer program or other software that specifies an algorithm that may be readily subdivided into coarse-grained sub-processes, such as distributed jobs 121-122, which may concurrently execute. Either of application 180 or central computer 190 may have serial logic that splits application 180 into distributed jobs. Any serial logic of application 180 may execute on central computer 190 or a particular peer computer of 111-112.

Each distributed job is configured to process one data partition on one peer computer. For example, distributed job 121 processes partition 131 on computer 111.

For example, data 185 may be a huge graph that has many vertices and edges. Application 180 may have logic that specifies a parallelizable loop.

For example, application 180 may seek paths within the graph that satisfy criteria. Each iteration of the parallel loop may search for matching paths that originate from a different vertex.

A parallel loop may be unrolled into individual iterations. In an embodiment, each iteration may be dispatched to a different peer computer as a distributed job.

In operation, system 100 may execute a parallel loop by executing each iteration of the loop on a peer computers as a distributed job. Upon receiving a distributed job, a peer computer subdivides the distributed job into fine-grained units of analysis work.

For example, a distributed job for a loop iteration may expand graph traversal paths that have reached a particular vertex. Multiple edges may radiate out from the vertex, and the distributed job may be split into units of work that each expands paths that traverse a different edge of the vertex.

For example, computer 112 may split distributed job 122 into units of analysis work such as computation tasks 141-142. Ideally, all of the computation tasks of distributed job 122 concurrently execute, such as when computer 112 has many idle cores or coprocessors.

However, the computation tasks of distributed job 122 may exceed the parallel processing capacity of computer 112. For example, distributed job 122 may have more computation tasks than computer 112 has processing cores.

2.3 Thread Pool

This surplus of computation tasks may be a computational backlog for computer 112 to manage, such as with thread pool 150. Thread pool 150 contains processor execution threads such as 161-162. The size (amount of threads) of thread pool 150 may be configured for available processing cores.

Application 180 may assign units of work to idle threads of thread pool 150. For example, distributed job 122 may assign computation task 141 to thread 161.

In an embodiment, each computer has one thread pool that is shared by all of the distributed jobs that are running on the computer. In an embodiment, each distributed job has its own thread pool. In an embodiment, a computer has a large shared pool of threads that may be dynamically subdivided into a smaller thread pool per distributed job.

2.4 Communication

The distributed jobs of application 180 may cross reference each other. For example, distributed job 121 may need some data from partition 132 that resides on another computer, 112.

For example, the subdivision of data 185 into at least partitions 131-132 may impose arbitrary partition boundaries that disregard data access patterns of application 180. To compensate for artificial partitioning, distributed job 121 may send data access request 170 to distributed job 122.

Data access request 170 may be a read request to retrieve data or a write request to store data. Computer 112 may receive and assign the processing of data access request 170 to an available thread of thread pool 150.

Data access request 170 may be delivered asynchronously, such as by message, or synchronously, such as by remote procedure call. Network transport may be connectionless, such as user datagram protocol (UDP), or connection oriented, such as transmission control protocol (TCP).

2.5 Bimodal Thread

Each thread of thread pool 150 is bimodal (has two operational modes). In communication mode, such a thread processes data access requests such as 170.

In computation mode, the thread executes computation tasks such as 141-142. Furthermore, the ratio of threads in communication mode to threads in computation mode may become suboptimal at any time.

As such, system 100 may dynamically rebalance the ratio of threads in either mode. Rebalancing occurs when at least one thread switches from one mode to the other. Rebalancing is discussed in more detail for FIGS. 3-5.

2.6 Synchronization

Completion of all outstanding distributed jobs of application 180 may be required for proper operation of application 180. Application 180 may proceed in steps.

Each step of application 180 may launch additional distributed jobs on computers 111-112. Completion of a prior step may be needed before starting a next step.

Central computer 190 may detect and announce completion of a step of application 180. This requires that all of the distributed jobs of a running step of application 180 should each announce their individual completion to central computer 190.

For example, computer 112 may complete distributed job 122 and then inform central computer 190. Distributed jobs 121-122 finish and independently inform central computer 190. Central computer 190 recognizes when it has been notified that all distributed jobs of application 180 terminated For example, computer 112 may complete distributed job 122 and then inform central computer 190 by sending a message or invoking a remote procedure call. In an embodiment, computer 112 informs central computer 190 by sending a single network packet, such as with Ethernet or InfiniBand.

3.0 Example Process

Figure 2:
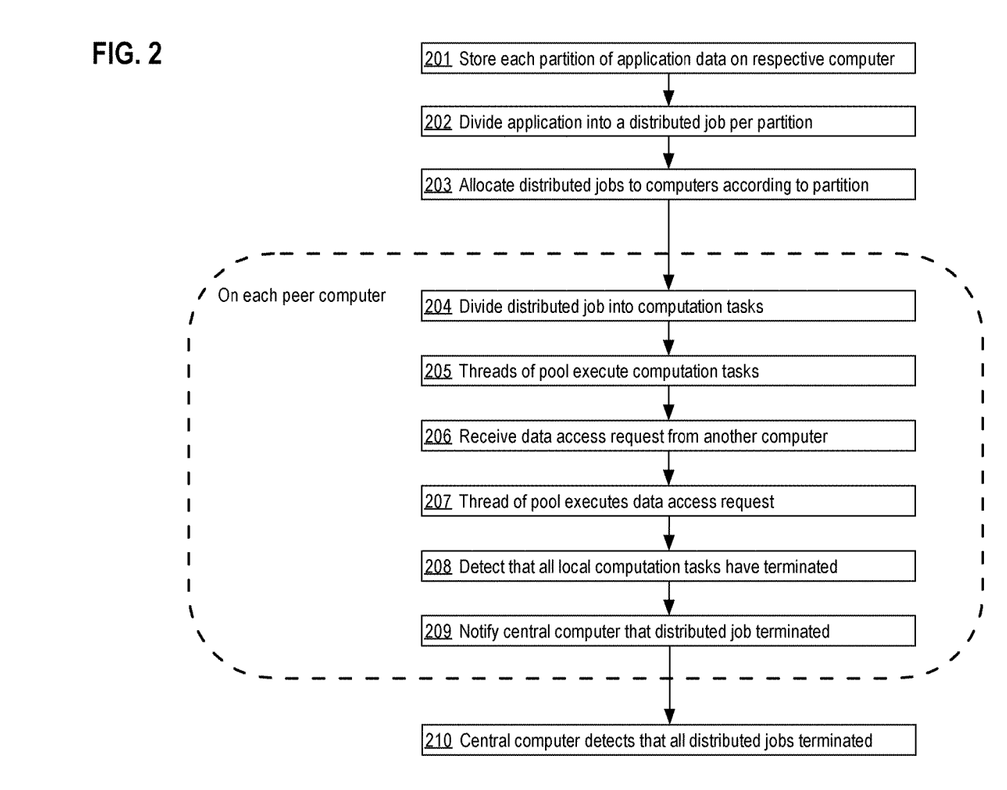
FIG. 2 is a flow diagram that depicts a process that dynamically self-balances communication and computation, in an embodiment.

FIG. 2 is a flow chart that depicts an example process that dynamically self-balances communication and computation, in an embodiment. As an example, the interactions and behaviors of this process are discussed with regard to the components of FIG. 1.

The steps of this process occur in three conceptual phases. Steps 201-204 are preparatory. Steps 205-207 are operational. Steps 208-210 are concluding.

3.1 Preparation

In step 201, data partitions of an application are stored on peer computers. For example, application 180 has data 185 that is split into at least partitions 131-132.

For example, computer 111 stores partition 131, either by physical containment or logical ownership and perhaps after retrieving partition 131 from a cross-mounted file system.

In step 202, the application is divided into a distributed job per partition. For example, central computer 190 may generate at least distributed jobs 121-122 to decompose application 180 into remotely executable jobs.

In step 203, the distributed jobs are distributed to computers for execution. For example, central computer 190 submits distributed jobs 121-122 to computers 111-112.

Central computer 190 may transmit distributed jobs as scripts, class files, descriptors, or other means of remote job encapsulation and submission. For example, job distribution may use simple object access protocol (SOAP), Java serialization, or Java remote method invocation (RMI).

Steps 204-209 are performed on all participating peer computers. In step 204, each computer divides its own distributed job into units of analysis work for local execution.

For example, computer 112 generates at least computation tasks 141-142 for distributed job 122. Generation by computer 112 may involve script generation or bytecode generation. For example, computation tasks 141-142 may implement a closure or a Java execution interface such as Runnable or Callable.

3.2 Operation

After step 204, system 100 is ready to execute computation tasks 141-142 on computer 112. However, this may demand more execution threads than computer 112 has processing cores.

In step 205, the computation tasks are executed by threads of a pool. For example, thread 161 of thread pool 150 may execute computation task 141.

For example, computer 112 may use pthreads threading library, C++ standard template library (STL), or classes of Java's concurrency package such as ThreadPoolExecutor. Computation task 142 may concurrently run on thread 162 or wait for thread 161 to execute task 142 after finishing task 141.

Some data may need transfer between two distributed jobs. In step 206, a data access request is received from another computer. For example, distributed job 121 of computer 111 sends data access request 170 to distributed job 122 of computer 112.

In step 207, a thread of the receiver's pool executes the data access request. For example, distributed job 122 receives data access request 170, takes idle thread 161 from thread pool 150, and executes data access request 170 on thread 161.

Thread pool 150 may have a backlog of work. At least computation tasks 141-142 and data access request 170 may compete for threads of thread pool 150.

For example with Java, distributed job 122 may simultaneously submit all of its computation tasks as Runnables to a ThreadPoolExecutor. ThreadPoolExecutor exposes and tracks concepts such as pending backlog, currently executing tasks, and finished work.

3.3 Coordination

Distributed job 122 runs until all of its computation tasks finish. In step 208, distributed job 122 detects that all of its computation tasks finished.

In an embodiment, distributed job 122 detects that ThreadPoolExecutor.invokeAll( ) has returned. In an embodiment, distributed job 122 initializes a countdown counter with the number of computation tasks in distributed job 122.

Each computation task may, upon its own completion, decrement the counter. Distributed job 122 may detect when the counter has counted down to zero.

In step 209, each peer computer announces completion of its distributed job to the central computer. For example after computation tasks 141-142 finish, distributed job 122 notifies central computer 190 that distributed job 122 is done.

Central computer 190 receives notification of each computer's distributed job completion. In step 210, the central computer detects that all outstanding distributed jobs of an application are finished.

For example when computer 111 is the first to announce completion of its distributed job 121 to central computer 190, central computer 190 recognizes that computer 112 has not yet announced completion of distributed job 122. However when computer 112 is the last to announces completion of its distributed job 122, then central computer 190 detects that application 180 has no more outstanding distributed jobs. Central computer 190 may have a countdown counter or other mechanism to detect completion of all distributed jobs of application 180.

Completion of all outstanding distributed jobs of application 180 may represent completion of application 180 itself or merely completion of an operational phase of application 180. For example immediately following step 210, application 180 may terminate or perform a next phase such as repeating the process of FIG. 2. Each phase may spawn distributed jobs that reuse logic of prior distributed jobs or have different logic.

4.0 Balancing Mechanisms and Heuristics

Figure 3:
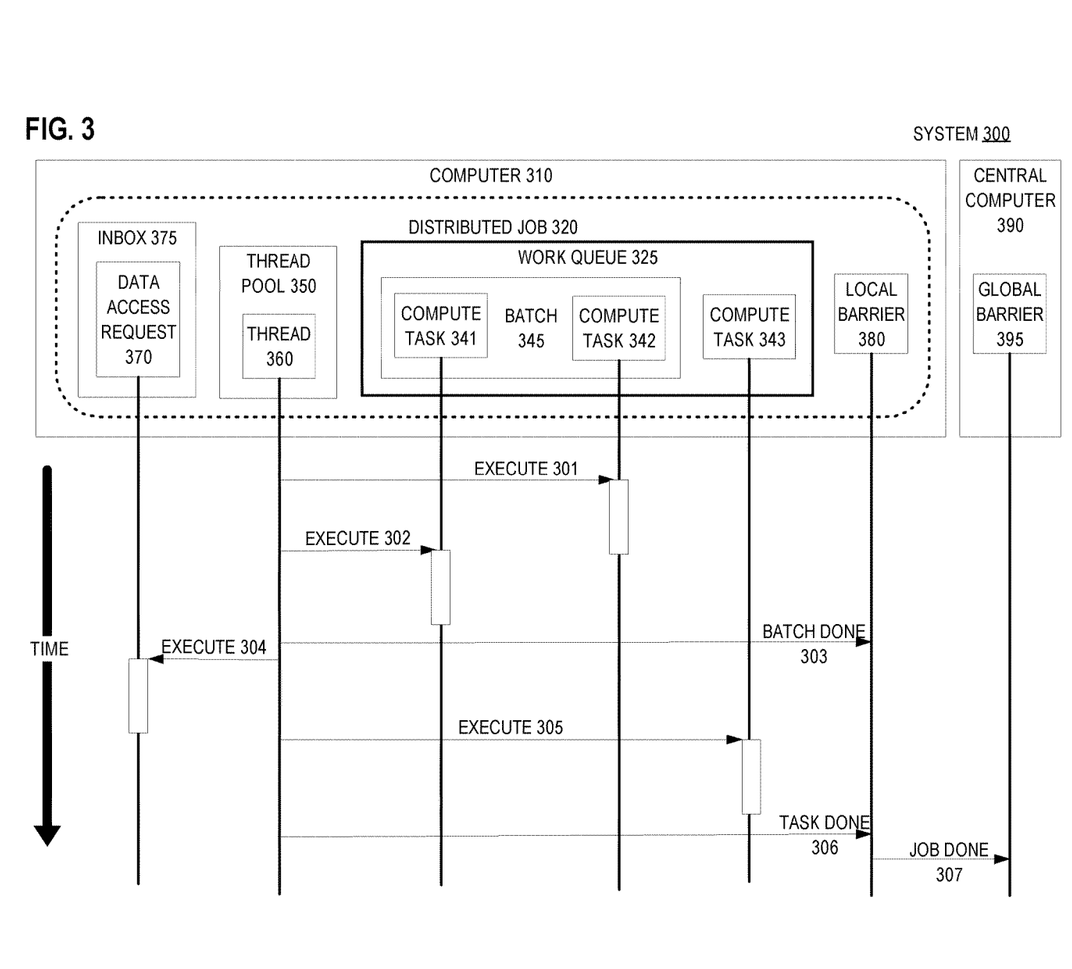
FIG. 3 is a scenario diagram that depicts interactions between computers within a distributed system that uses heuristics and special configuration to prioritize work, in an embodiment.

FIG. 3 is a scenario diagram that depicts example interactions of an example system 300 to prioritize work by heuristics, in an embodiment. System 300 may be an implementation of system 100.

System 300 contains central computer 390 and a plurality of peer computers such as 310. Computer 310 runs distributed job 310 that contains thread pool 350 to execute tasks, work queue 325 to manage backlog, and local barrier 380 to detect completion of distributed job 310.

4.1 Work Queue

Distributed job 310 is split into compute tasks 341-343 that are stored in work queue 325. Work queue 325 may be a linked list, an array, a priority queue, a heap, or other passive container of compute tasks. The contents of work queue 325 may be ordered or unordered.

4.2 Multitasking

Thread pool 350 contains bimodal threads such as 360 that can switch back and forth between communication mode and computation mode. In an embodiment, thread 360 has an opportunity to switch modes when the thread is between tasks.

In an embodiment that emphasizes liveliness, thread 360 may be heavily biased toward communication such that thread 360 switches to communication mode at any opportunity when a data access request awaits execution. For example, computer 310 may contain inbox 375 that stores pending data access requests such as 370.

4.3 Inbox

In an embodiment, each distributed job on computer 310 has its own inbox. In an embodiment, some or all distributed jobs on computer 310 share an inbox.

During an opportunity to switch tasks, such as when finishing execution of a prior task or while idling within thread pool 350, thread 360 may detect that inbox 375 is not empty. Such conditions may cause thread 360 to switch into or remain in communication mode to process some or all of the data access requests within inbox 375. Whereas if inbox 375 is empty, then thread 360 may instead switch to or remain in computation mode.

4.4 Bias

In an embodiment that emphasizes throughput, thread 360 may be heavily biased toward computation. For example, thread 360 may refrain from switching to communication mode except when work queue 325 is exhausted (empty) of compute tasks.

The bias of thread 360 is configurable between the extremes of always favoring one mode or the other mode. For example, a bias toward communication may be reduced by eliminating some opportunities to switch into communication mode.

4.5 Batch

In an embodiment, thread 360 may execute a batch of multiple compute tasks without checking the status of inbox 375, instead of checking after each compute task of the batch. For example, thread 360 may execute tasks 341-342 together as batch 345.

Interactions between components of system 300 are shown as horizontal arrows. For example, execute 301 marks when thread 360 begins running compute task 342. Each interaction may be implemented as a subroutine, remote procedure call, message, or other invocation mechanism.

As shown, time flows downward. For example, execute 301 occurs before execute 302.

The period for which a task runs is shown as an empty vertical rectangle. For example, a rectangle marks when compute task 342 runs, starting at the arrowhead of execute 301.

Compute tasks of a batch execute serially, which is one at a time. For example, execute 302 of compute task 341 does not occur until compute task 342 finishes running.

4.6 Local Barrier

Distributed job 325 finishes when all of its compute tasks have run. Distributed job 325 uses local barrier 380 to detect completion of all compute tasks.

Completion of an individual compute task may be announced to local barrier 380. For example when finished running compute task 343, thread 360 announces this, shown as task done 306. In a preferred embodiment, completion of each compute task of work queue 325 is separately announced.

In an alternative embodiment as shown, completion of a batch of compute tasks may be announced instead of separately announcing the completions of the compute tasks within the batch. For example when finished running batch 345, thread 360 announces this, shown as batch done 303, which may bear a parameter that indicates what size (how many compute tasks) did the batch have.

System 300 is biased toward communication instead of computation. However, this bias is attenuated by batching of compute tasks.

For example, batch 345 runs from execute 301 until batch done 303. During that period, distributed job 320 may receive data access request 370.

However, thread 360 will not preempt (interrupt) a batch to execute a data access request. After batch done 303, thread 360 may decide which of data access request 370 or compute task 343 to execute next. Because system 300 is biased toward communication, thread 360 executes data access request 370 before compute task 343.

In a preferred embodiment, local barrier 380 may have a countdown counter that keeps track of how many threads within thread pool 350 are still running compute tasks (of distributed job 320). Initialization of distributed job 320 may include initialization of the countdown counter. The countdown counter may initially record the number of threads within thread pool 350.

If no more tasks are in work queue 325 when thread 360 finishes a compute task, then thread 360 may idle or be reassigned to a different distributed job and a different thread pool. When this occurs, the countdown counter may be decremented by one.

The countdown counter reaches zero when all threads of thread pool 350 have finished with distributed job 320. When the countdown counter reaches zero, local barrier 380 sends job done 307 to central computer 390.

In another embodiment, the countdown counter may initially record the number of compute tasks within distributed job 320. The countdown counter is decremented by two upon receiving batch done 303 and by one upon receiving task done 306. When local barrier 380 has counted down to zero, it sends job done 307 to central computer 390. Job done 307 may bear an identifier of distributed job 320.

In an embodiment, local barrier 380 sends job done 307 even when inbox 375 contains a data access request. In other words, peer computers that expect data from the data partition of distributed job 320 do not prevent computer 310 from reporting that distributed job 320 is done.

4.7 Global Barrier

Furthermore, central computer 390 has global barrier 395 that may have a countdown counter to detect completion of all outstanding distributed jobs of an application. In an embodiment having many peer computers, system 300 may hierarchically arrange multiple global barriers per application.

For example, two hundred computers may be logically arranged into groups of twenty computers, such that each group shares an intermediate barrier. When each intermediate barrier is broken (detected that its distributed jobs completed), then the intermediate barrier notifies a global barrier. Based on such notifications, the global barrier may detect that all distributed jobs of an application or application phase are done.

Likewise, a physical network hierarchy, such as a hierarchy of network switches or a multistage interconnection network (MIN), may have a hierarchy of barriers per application. In an embodiment, the tiers of the barrier hierarchy reflect the physical tiers of the switch hierarchy.

5.0 Multitenancy

Figure 4:
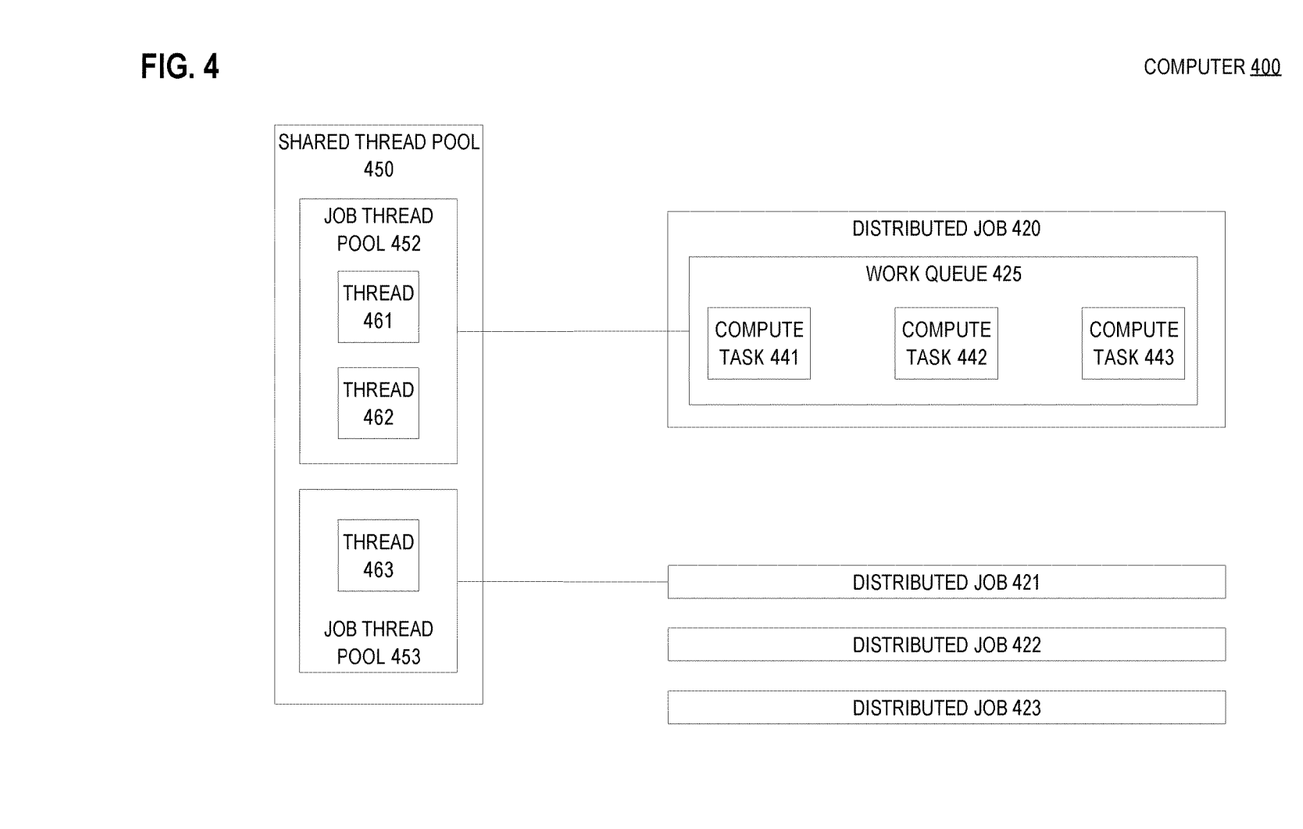
FIG. 4 is a block diagram that depicts a multitenant distributed analysis system, in an embodiment.

FIG. 4 is a block diagram that depicts example computer 400 that simultaneously runs distributed jobs of multiple analysis applications, in an embodiment. Computer 400 may be one of many computer peers within a system that may be an implementation of system 100.

Computer 400 simultaneously hosts distributed jobs 420-423, each of which belongs to a different analysis application. In an embodiment, distributed jobs 420-423 share and analyze a same data partition.

For example, the shared partition may be a database table partition or a portion of a graph. In an embodiment the shared partition is immutable (read only).

5.1 Multitenant Thread Pool

Computer 400 contains shared thread pool 450, which is a resource that is available to all of the distributed jobs that run on computer 400. Shared thread pool 450 contains threads 461-463.

5.2 Job Thread Pool

However, shared thread pool 450 is large and contains job thread pools 452-453, which are smaller. The threads of shared thread pool 450 are divided amongst job thread pools 452-453.

Computer 400 assigns each job thread pool a distributed job to run. For example, job thread pool 452 runs distributed job 420.

5.3 Priority

Each distributed job (or its analysis application) may have a priority, such as numeric ranking. For example, an administrator may regard distributed job 420 to be more important or urgent than distributed job 421.

As such, the administrator may assign distributed job 420 a higher priority than distributed job 421. Each distributed job or each application may have parameters that include priority. Computer 400 may use the relative priorities of its concurrent distributed jobs to determine an allocation of threads to job thread pools 452-453.

In an embodiment, threads are apportioned amongst job thread pools according to the ratio of each job's priority to the sum of all concurrent jobs' priority. For example, distributed job 421 may have a priority of two, and distributed job 420 may have a priority of four.

In this example, the sum of all priorities is 2+4=six. Therefore, job thread pool 453 that runs distributed job 421 (which has priority of two) should be allotted 2/6=one third of the threads of shared thread pool 450. Whereas, job thread pool 452 that runs distributed job 420 (which has priority of four) should be allotted 4/6=two thirds of the threads of shared thread pool 450.

5.4 Rebalancing

The mix of distributed jobs on computer 400 may be dynamic. When a new distributed job arrives or an old one completes, computer 400 may rebalance the apportionment of threads to job thread pools.

For example, computer 400 may initially host only distributed job 420. In that case, all of the threads of shared thread pool 450 are allocated to job thread pool 452.

Computer 400 then receives distributed job 421, creates job thread pool 453, and then rebalances the apportionment of the threads of shared thread pool 450 according to the arithmetic discussed above. Reassignment of a thread from one job thread pool to another job thread pool may involve additional housekeeping.

For example when job thread pool 453 is created, thread 463 is moved into it from job thread pool 452. However at that time, thread 463 may still be running a compute task, such as 441, of distributed job 420.

In that case, thread 463 continues to run compute task 441 to completion. As such, thread 463 is unavailable to newly-arrived distributed job 421 until thread 463 finishes compute task 441.

Furthermore, this ready ability to seamlessly rebalance may be performed at any time, instead of waiting for the arrival of a new distributed job. For example, a job thread pool may come into a surplus of threads when most of a distributed job's compute tasks are done.

In an embodiment, a thread moves to another job thread pool instead of idling in a current job thread pool when there are no more compute tasks of the current job for the thread to run. For example, an idle thread may trigger a rebalancing that causes movement of the thread into a different job thread pool.

In an embodiment, a computation task of a distributed job may only use a bimodal thread from the job thread pool of that particular distributed job. Whereas, a data access request may use an idle bimodal thread from any job thread pool, even a pool owned by a different distributed job.

Computer 400 may consider various factors when apportioning threads amongst job thread pools. For example, computer 400 may adjust the priorities of distributed jobs according to factors and then rebalance based on the adjusted priorities.

5.5 Aging

Starvation is an accidental lack of access to processor execution, such as when one distributed job consumes processor resources to the exclusion of another distributed job. Aging is a technique to avoid starvation. In an embodiment, the priority of a distributed job is increased as it ages. Aging entails measuring a duration for a distributed job that has elapsed since an event that depends on the embodiment.

In an embodiment, the age of a distributed job is measured starting from the time that the job was dispatched to the peer computer for execution. In an embodiment, the age is measured from the time that the job thread pool of the job last began running a compute task.

5.6 Bias

Analysis applications differ on the mix of data access requests that they generate. For example, an application may generate more read requests than write requests, or vice versa.

A write request may be asynchronous, such as according to the fire-and-forget communication pattern. For example, a compute task may send a write request without blocking and continue computing.

Whereas, a compute task may send a read request to another computer and then block and wait for retrieved data. As such, write requests do not significantly impact computational throughput, whereas read requests may.

In an embodiment, an application may be manually or automatically designated as having a communication pattern that is primarily reading or primarily writing. The priority of an application that primarily reads may be increased so that its distributed jobs may have more threads in their job thread pools to alleviate backpressure caused by more overhead spent managing the more complicated lifecycle of a read request.

5.7 Prioritization

Reapportioning threads between job thread pools is only one way of rebalancing. In an embodiment, rebalancing instead or additionally entails adjusting the native scheduling priority of one, some, or all threads of shared thread pool 450. For example, frameworks such as pthreads and Java allow adjustment of thread priority.

In an embodiment, computer 400 stores a backlog of distributed jobs or their computation tasks in a priority queue before executing them. The priority queue may be sorted according to the priorities of computation tasks, distributed jobs, or applications.

6.0 Communication

Figure 5:
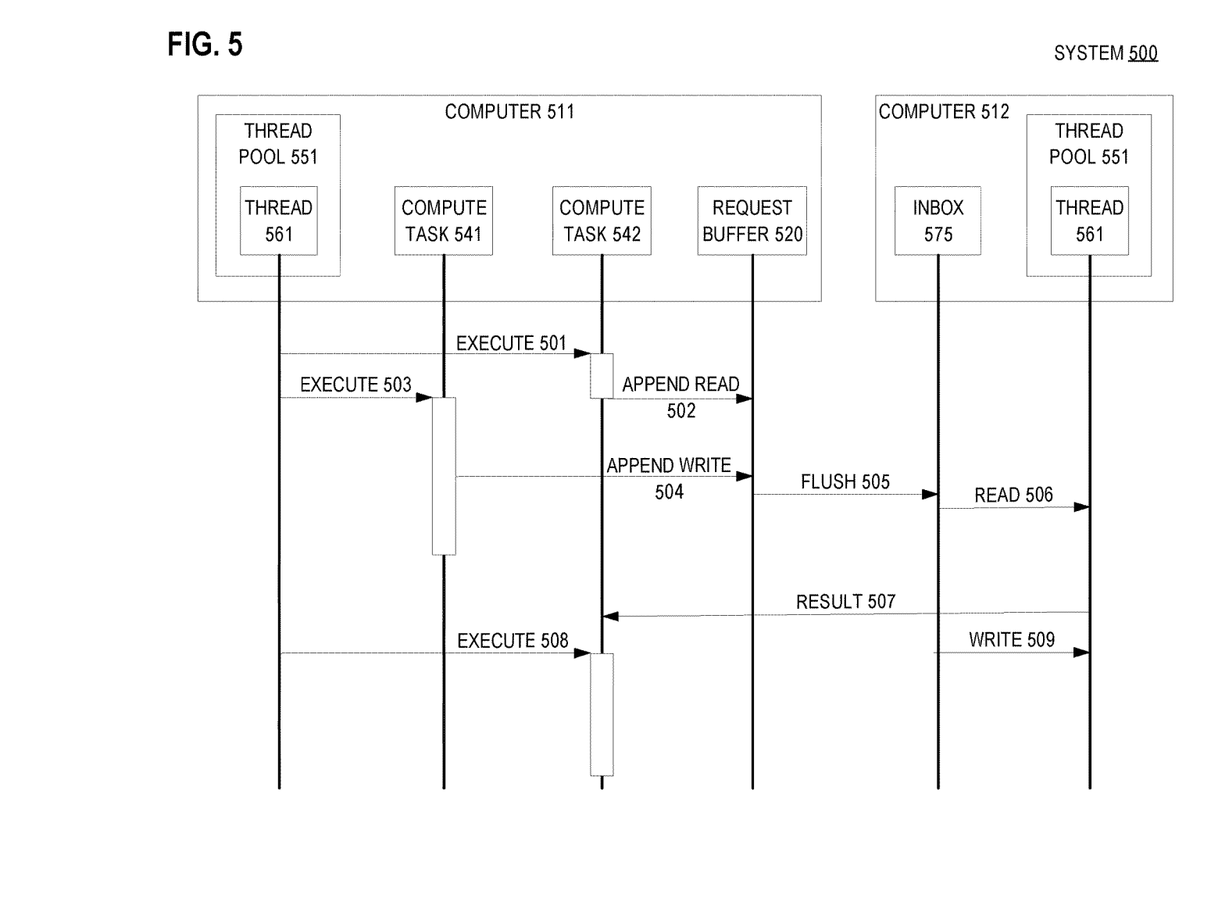
FIG. 5 is a scenario diagram that depicts interactions between computers with heuristics to manage communication, in an embodiment.

FIG. 5 is a block diagram that depicts example system 500 with heuristics to manage communication, in an embodiment. System 500 may be an implementation of system 100.

System 500 contains at least peer computers 511-512 that run distributed jobs. In this example, computer 511 contains a backlog of work.

For example, the amount of pending compute tasks of computer 511 may exceed the amount of threads in thread pool 551 of computer 511. As such at execute 501, thread 561 begins running compute task 542. Meanwhile, compute task 541 cannot yet run for lack of an available thread.

While in the midst of running, compute task 542 generates a read request to send to computer 512. The read request is shown as append read 502, which is not immediately sent to computer 512.

6.1 Outbound: Buffering and Blocking

Computer 511 contains request buffer 520 that temporarily stores outbound read and write requests. Computer 511 does not send the contents of request buffer 520 until the buffer is full.

Append read 502 is appended to request buffer 520. Compute task 542 blocks awaiting data retrieval.

However, this does not block thread 561 that was running compute task 542. Instead, thread 561 switches to executing another compute task, such as 541. This is shown as execute 503.

While in the midst of running, compute task 541 generates a write request to send to computer 512, shown as append write 504. Append write 504 is also appended to request buffer 520 instead of directly sending append write 504 to computer 512.

At this time, request buffer 520 contains append read 502 and append write 504. In this example, request buffer 520 is now full because it only has storage capacity for two messages. However in another example, request buffer 520 may instead have capacity to store more messages.

Becoming full causes request buffer 520 to send its contents to computer 512, shown as flush 505. Buffering may reduce overhead, such as latency, which is associated with fine-grained chatter between computers.

In an embodiment, computer 511 has a separate request buffer for each distributed job that runs on computer 511. In an embodiment, computer 511 has, for each distributed job, a separate buffer for each participating peer computer. In an embodiment, computer 511 has a separate request buffer for each participating peer computer, which some or all distributed jobs share.

6.1 Inbound

Flush 505 transfers append read 502 and append write 504 into inbox 575 of computer 512. These data access requests wait within inbox 575 until a thread becomes available to process one or both of them.

For example, bimodal thread 561 of thread pool 551 of computer 512 may switch, if not already, into communication mode. Thread 561 may process some or all requests of inbox 575.

During read 506 thread 561 executes append read 502. Thread 561 retrieves the desired data and answers by sending result 507 back to compute task 542.

This unblocks compute task 542 that was waiting for append read 502 to be answered. Eventually, thread 561 is available to resume compute task 542, shown as execute 508.

Meanwhile on computer 512, thread 561 still processes inbox 575. This includes executing append write 504, shown as write 509.

The ability to suspend and resume a compute task, such as 542, based on communication and data availability enables higher utilization of local processing cores, thereby increasing system throughput. This may complement the techniques already described herein, including thread bimodality, high-level communication buffering, unit-of-work batching, thread pool reapportioning, and operational biasing. Dynamic and optimal scheduling of computation and communication is an emergent property of the general-purpose combination of some or all of these techniques, without the need for a-priori analysis of application-specific communication patterns.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
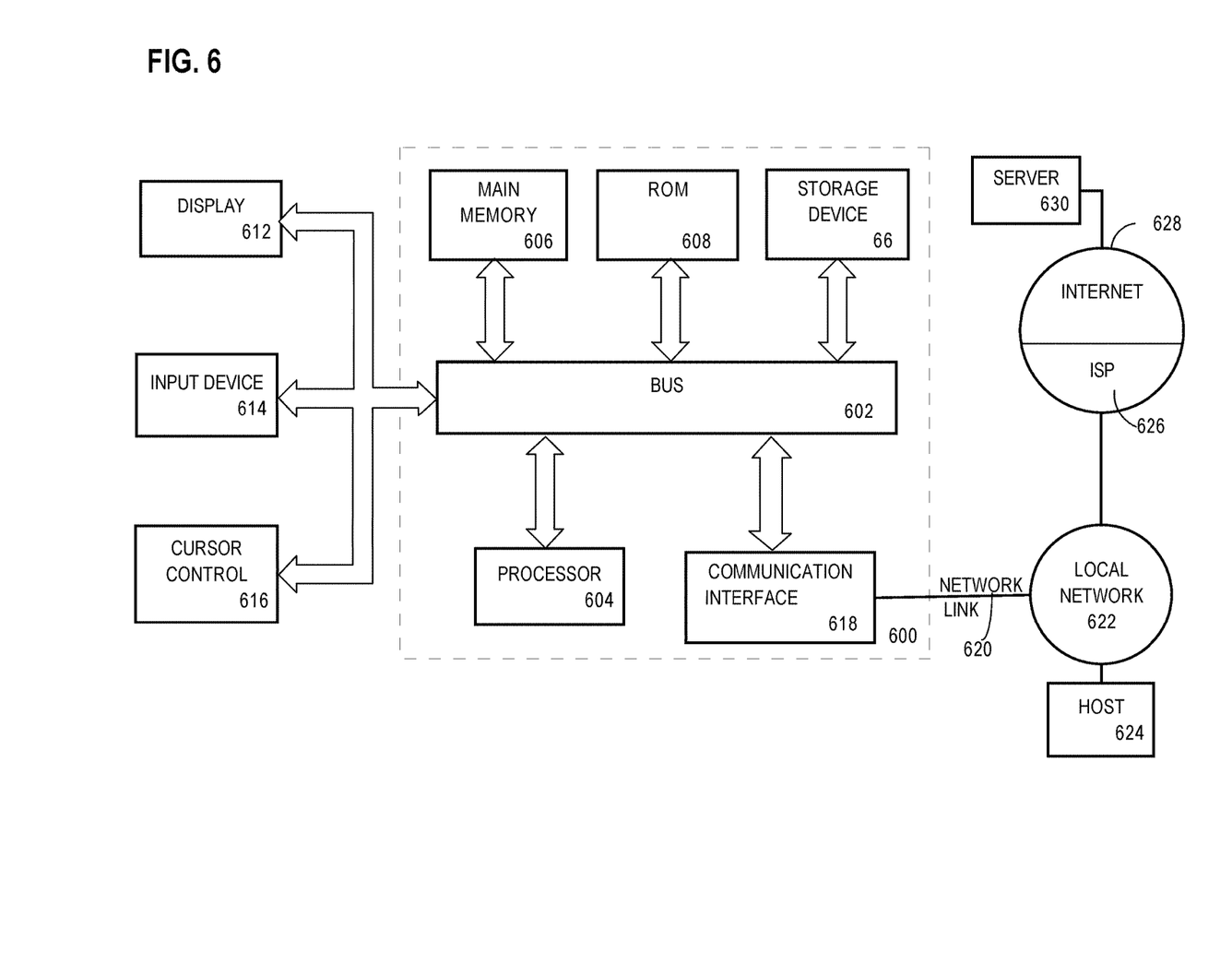
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 66, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 66. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 66. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 66 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 66, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing each data partition, of a plurality of data partitions of an application, on a respective computer of a plurality of computers;
    dividing said application into a plurality of distributed jobs, wherein each distributed job of said plurality of distributed jobs corresponds to a respective data partition of said plurality of data partitions;
    distributing each distributed job of said plurality of distributed jobs to a computer, of said plurality of computers, that stores the data partition that corresponds to the distributed job;
    processing said plurality of data partitions, based on said plurality of distributed jobs on said plurality of computers, including on a first computer of said plurality of computers, processing the data partition stored on the first computer, based on the distributed job of the first computer, to perform:
        dividing the distributed job of the first computer into one or more computation tasks;
        executing, by one or more bimodal threads that may alternate between a computation mode that can execute computation tasks and a communication mode that can fulfill data access requests, said one or more computation tasks;
        sending, by a particular bimodal thread of said one or more bimodal threads while the particular bimodal thread executes a particular computation task of said one or more computation tasks, a request to a second computer of said plurality of computers to read data;
        switching, in response to said sending said request and without completing said particular computation task, said particular bimodal thread from executing said particular computation task to performing other activity; and
        resuming, in response to receiving said data, execution of said particular computation task.

2. The method of claim 1 wherein:
    each computer of said plurality of computers contains a local barrier;
    executing said one or more computation tasks comprises:
        executing, by a second thread of a thread pool that contains said one or more bimodal threads, a computation task of said one or more computation tasks;
        indicating, to the local barrier of the first computer and without blocking said second thread, that said computation task is terminated; and
        executing, by said second thread and after indicating that said computation task is terminated, an other task that comprises at least one of: a second data access request that is received from a third computer of said plurality of computers or a second computation task of said one or more computation tasks.

3. The method of claim 2 wherein executing said other task comprises deciding to execute said second data access request before executing said second computation task.

4. The method of claim 2 further comprising indicating that more than one computation task of said one or more computation tasks are terminated.

5. The method of claim 1 wherein:
    said plurality of distributed jobs is a first plurality of distributed jobs;
    said plurality of data partitions are shared by said application and a second application;
    the method further comprises:
        distributing each distributed job of a second plurality of distributed jobs of said second application to said plurality of computers;
        simultaneously executing said first plurality of distributed jobs and said second plurality of distributed jobs.

6. The method of claim 5 wherein simultaneously executing said first plurality of distributed jobs and said second plurality of distributed jobs comprises storing computation tasks of said first plurality of distributed jobs and computation tasks of said second plurality of distributed jobs into one or more work queues.

7. The method of claim 5 wherein:
    a computer of said plurality of computers concurrently hosts a first distributed job of said application and a second distributed job of the second application;
    the method further comprises prioritizing computation tasks, of said first distributed job and said second distributed job, based on a priority of said first distributed job, a priority of said second distributed job, and a prioritization mechanism;
    said prioritization mechanism comprises at least one of:
        adjusting a priority of a thread; or
        sorting of computation tasks, of said first distributed job and said second distributed job, within a priority queue;
    said priority of said first distributed job is based on at least one of:
        the application being designated as mostly writing, or
        an age of said first distributed job.

8. The method of claim 5 wherein executing said one or more computation tasks comprises:
    executing, by a second thread of a thread pool that contains said one or more bimodal threads, a computation task of said one or more computation tasks;
    deciding to execute, by said second thread, a second computation task of said one or more computation tasks before executing a third computation task of said second application because said computation task and said second computation task are of a same distributed job.

9. The method of claim 1 further comprising:
    sending, by a second thread of a thread pool that contains said one or more bimodal threads to a third computer, a request to retrieve second data;
    switching said second thread, before receiving said second data, to a computation task of said one or more computation tasks of the distributed job.

10. The method of claim 1 further comprising:
    receiving, from a second computer of said plurality of computers, a data access request;
    indicating, after receiving said data access request and before executing said data access request finishes, that the distributed job has terminated.

11. The method of claim 1 wherein each distributed job of said plurality of distributed jobs corresponds to a parallel loop iteration.

12. The method of claim 1 wherein:
    said data of said application comprises a graph;
    each computation task of said one or more computation tasks of the distributed job comprises a subset of vertices of said graph.

13. The method of claim 1 further comprising indicating, by sending only one network packet to a central computer, that the distributed job has terminated.

14. A method comprising:
storing each data partition, of a plurality of data partitions of a first application, on a respective computer of a plurality of computers;
dividing said first application into a first plurality of distributed jobs, wherein each distributed job of said first plurality of distributed jobs corresponds to a respective data partition of said plurality of data partitions;
distributing each distributed job of said first plurality of distributed jobs to a computer, of said plurality of computers, that stores the data partition that corresponds to the distributed job;
distributing each distributed job of a second plurality of distributed jobs of a second application to said plurality of computers, wherein said plurality of data partitions are shared by said first application and the second application;
simultaneously executing said first plurality of distributed jobs and said second plurality of distributed jobs, including processing said plurality of data partitions, based on said first plurality of distributed jobs on said plurality of computers, including on a first computer of said plurality of computers, processing the data partition stored on the first computer to perform:
dividing a first distributed job of said first plurality of distributed jobs into one or more computation tasks for the first computer;
simultaneously:
executing, by one or more threads of a first thread pool, said one or more computation tasks;
executing computation tasks of a second distributed job of said second plurality of distributed jobs using a second thread pool wherein the ratio of the size of said first thread pool to the size of said second thread pool is based on the ratio of a priority of said first distributed job of said first computer to a priority of said second distributed job; and
receiving, from a second computer of said plurality of computers, a data access request;
executing, by a thread of said first thread pool and in response to detecting that at least one of said one or more computation tasks has terminated, said data access request;
detecting that the distributed job has terminated based on detecting that all computation tasks of said one or more computation tasks have terminated; and
indicating, to a central computer, that the distributed job has terminated;
detecting, by said central computer and based on said indicating by said plurality of computers, that said first plurality of distributed jobs have terminated.

15. A method comprising:
storing each data partition, of a plurality of data partitions of an application, on a respective computer of a plurality of computers;
dividing said application into a plurality of distributed jobs, wherein each distributed job of said plurality of distributed jobs corresponds to a respective data partition of said plurality of data partitions;
distributing each distributed job of said plurality of distributed jobs to a computer, of said plurality of computers, that stores the data partition that corresponds to the distributed job;
processing said plurality of data partitions, based on said plurality of distributed jobs on said plurality of computers, including on a first computer of said plurality of computers, processing the data partition stored on the first computer, based on the distributed job of the first computer, to perform:
dividing the distributed job of the first computer into one or more computation tasks;
simultaneously:
receiving, from a second computer of said plurality of computers, a data access request; and
executing, by one or more threads of a thread pool, said one or more computation tasks, including:
storing, by a computation task of said one or more computation tasks, a second data access request into a buffer of the first computer;
storing, by a second computation task of said one or more computation tasks, a third data access request into said buffer; and
sending, in a single communication to said second computer, said second data access request and said third data access request;
executing, by a thread of said thread pool and in response to detecting that at least one of said one or more computation tasks has terminated, said data access request;
detecting that the distributed job has terminated based on detecting that all computation tasks of said one or more computation tasks have terminated; and
indicating, to a central computer, that the distributed job has terminated;
detecting, by said central computer and based on said indicating by said plurality of computers, that said plurality of distributed jobs have terminated.

16. A system comprising:
a communication network;
a plurality of computers connected to the communication network, wherein each computer of said plurality of computers is configured to:
store a data partition of a plurality of data partitions of an application;
receive a distributed job of a plurality of distributed jobs, wherein each distributed job of said plurality of distributed jobs corresponds to a respective data partition of said plurality of data partitions;
process the data partition, based on the distributed job, to perform:
dividing the distributed job of the computer into one or more computation tasks;
executing, by one or more bimodal threads that may alternate between a computation mode that can execute computation tasks and a communication mode that can fulfill data access requests, said one or more computation tasks;
sending, by a particular bimodal thread of said one or more bimodal threads while the particular bimodal thread executes a particular computation task of said one or more computation tasks, a request to a second computer of said plurality of computers to read data;
switching, in response to said sending said request and without completing said particular computation task, said particular bimodal thread from executing said particular computation task to performing other activity; and resuming, in response to receiving said data, execution of said particular computation task.

17. One or more non-transitory computer-readable media containing instructions that, when executed by one or more processors, cause:

storing each data partition, of a plurality of data partitions of an application, on a respective computer of a plurality of computers;

dividing said application into a plurality of distributed jobs, wherein each distributed job of said plurality of distributed jobs corresponds to a respective data partition of said plurality of data partitions;

distributing each distributed job of said plurality of distributed jobs to a computer, of said plurality of computers, that stores the data partition that corresponds to the distributed job;

processing said plurality of data partitions, based on said plurality of distributed jobs on said plurality of computers, including on a first computer of said plurality of computers, processing the data partition stored on the first computer, based on the distributed job of the first computer, to perform:

dividing the distributed job of the first computer into one or more computation tasks;

executing, by one or more bimodal threads that may alternate between a computation mode that can execute computation tasks and a communication mode that can fulfill data access requests, said one or more computation tasks;

sending, by a particular bimodal thread of said one or more bimodal threads while the particular bimodal thread executes a particular computation task of said one or more computation tasks, a request to a second computer of said plurality of computers to read data;

switching, in response to said sending said request and without completing said particular computation task, said particular bimodal thread from executing said particular computation task to performing other activity; and resuming, in response to receiving said data, execution of said particular computation task.

18. The one or more non-transitory computer-readable media of claim 17 wherein executing said one or more computation tasks comprises:

hosting, on each computer of said plurality of computers, a respective local barrier;

executing, by a second thread of a thread pool that contains said one or more bimodal threads, a computation task of said one or more computation tasks;

indicating, to the local barrier of the first computer and without blocking said second thread, that said computation task is terminated; and executing, by said second thread and after indicating that said computation task is terminated, another task that comprises at least one of: a second data access request that is received from a third computer of said plurality of computers or a second computation task of said one or more computation tasks.

19. The one or more non-transitory computer-readable media of claim 17 wherein:

said plurality of distributed jobs is a first plurality of distributed jobs;

said plurality of data partitions are shared by said application and a second application;

the instructions further cause:

distributing each distributed job of a second plurality of distributed jobs of said second application to said plurality of computers;

simultaneously executing said first plurality of distributed jobs and said second plurality of distributed jobs.

20. The one or more non-transitory computer-readable media of claim 17 wherein the instructions further cause:

storing, by a computation task of said one or more computation tasks, a second data access request into a buffer of the first computer;

storing, by a second computation task of said one or more computation tasks, a third data access request into said buffer;

sending, in a single communication to said second computer, said second data access request and said third data access request.

* * * * *

UNITED STATES PATENT AND TRADEMARK OFFICE
CERTIFICATE OF CORRECTION

PATENT NO. : 10,275,287 B2
APPLICATION NO. : 15/175920
DATED : April 30, 2019
INVENTOR(S) : Manhardt et al.

Page 1 of 1

It is certified that error appears in the above-identified patent and that said Letters Patent is hereby corrected as shown below:

In the Specification

In Column 5, Lines 30-31, delete "terminated" and insert -- terminated. --, therefor.

In the Claims

In Column 7, Line 39, in Claim 14, delete "pool" and insert -- pool, --, therefor.

Signed and Sealed this
Fourth Day of August, 2020

Andrei Iancu
*Director of the United States Patent and Trademark Office*